United States Patent [19]

Przybylinski et al.

[11] Patent Number: 4,633,787
[45] Date of Patent: Jan. 6, 1987

[54] LIGHT WEIGHT GONDOLA TYPE RAILWAY CAR

[75] Inventors: Phillip G. Przybylinski, Schererville; Donald C. Bodinger, Crown Point, both of Ind.

[73] Assignee: Pullman Standard Inc., Chicago, Ill.

[21] Appl. No.: 596,968

[22] Filed: Apr. 5, 1984

[51] Int. Cl.[4] .............................................. B61D 9/08
[52] U.S. Cl. .................. 105/406.1; 105/418; 105/419
[58] Field of Search ................ 105/406 R, 355, 396, 105/404, 413, 414, 417, 418, 420, 419

[56] References Cited

U.S. PATENT DOCUMENTS

| | | | |
|---|---|---|---|
| 2,033,566 | 3/1936 | Wine | 105/406 R |
| 2,035,113 | 3/1936 | Blomberg | 105/418 |
| 2,565,709 | 8/1951 | Watter | 105/414 X |
| 3,509,827 | 5/1970 | Sutter | 105/418 X |
| 3,557,714 | 1/1971 | Aquino et al. | 105/406 R |
| 4,236,459 | 12/1980 | Teoli | 105/406 R |

FOREIGN PATENT DOCUMENTS 455943  4/1949  Canada .............................. 105/404

OTHER PUBLICATIONS

Railway Locomotives and Cars, *Gondolas Have Aluminum Bodies*, Apr. 1960, pp. 27-29.
Standard Handbook for Mechanical Engineers, Seventh Ed., Baumeister & Marks, McGraw-Hill, New York, 1975, pp. 5-8 and 5-9.

Primary Examiner—David A. Scherbel
Assistant Examiner—Glenn B. Foster
Attorney, Agent, or Firm—Richard J. Myers & Assoc.

[57] ABSTRACT

A light weight, aerodynamically efficient gondola car for hauling bulk cargo, such as coal, ores and grains, has a cargo carrying structure formed of welded aluminum. A side sill member formed of extruded aluminum has side and bottom connective portions which are continuously welded to the sides and bottom respectively, and a strength portion which remains substantially unwelded in assembly to thereby retain its full strength.

35 Claims, 10 Drawing Figures

FIG-4-

Fig_6_

Fig_7_

Fig_5_

LIGHT WEIGHT GONDOLA TYPE RAILWAY CAR

BACKGROUND OF THE INVENTION

1. Related Applications

This application is related to U.S. patent application Ser. No. 583,647 filed Feb. 27, 1984 entitled "AERODYNAMICALLY STRUCTURED RAILWAY CAR"; U.S. patent application Ser. No. 584,016 filed Feb. 27, 1984 entitled "AIR FLOW GUIDE STRUCTURE FOR OPEN TOP RAILWAY CAR"; and U.S. patent application Ser. No. 597,125 filed Apr. 5, 1984 entitled "BOLSTER FOR RAILWAY CAR".

2. Field of the Invention

This invention relates to railway cars of the gondola type having a depressed bottom cargo carrying structure formed of a weldable aluminum alloy to make the car more energy efficient in transit in both the loaded and unloaded condition.

DESCRIPTION OF THE PRIOR ART

U.S. Pat. Nos. 3,557,714 and 3,572,252 each show previous efforts to construct a railway car using aluminum.

U.S. Pat. No. 4,024,821 shows brace construction used to rigidify a gondola type railway car.

U.S. Pat. No. 4,252,067 shows a lightweight fabricated member which serves as the top chord of a side wall of a gondola type car.

U.S. Pat. Nos. 3,713,400; 3,841,236; 4,212,252; 4,236,459; 4,254,714; 4,331,083 and 4,361,097 all show previous efforts to develop gondola type cars having lowered or depressed bottom portions for increasing the lading capacity of the car and/or lowering the center of gravity of the car to increase its stability.

None of the above mentioned patents disclose a gondola type car having the features taught in the disclosure.

SUMMARY OF THE INVENTION

A railway car having exterior surfaces for promoting airflow has a cargo carrying structure formed of an aluminum alloy. The cargo carrying structure has skeletal support members formed of aluminum extrusions structured to weldingly receive and be rigidly engaged with aluminum alloy plates to form a lightweight, relative to steel, car having airflow promoting features.

DETAILED DESCRIPTION OF THE PREFERRED EMBODIMENT

Figure 1:
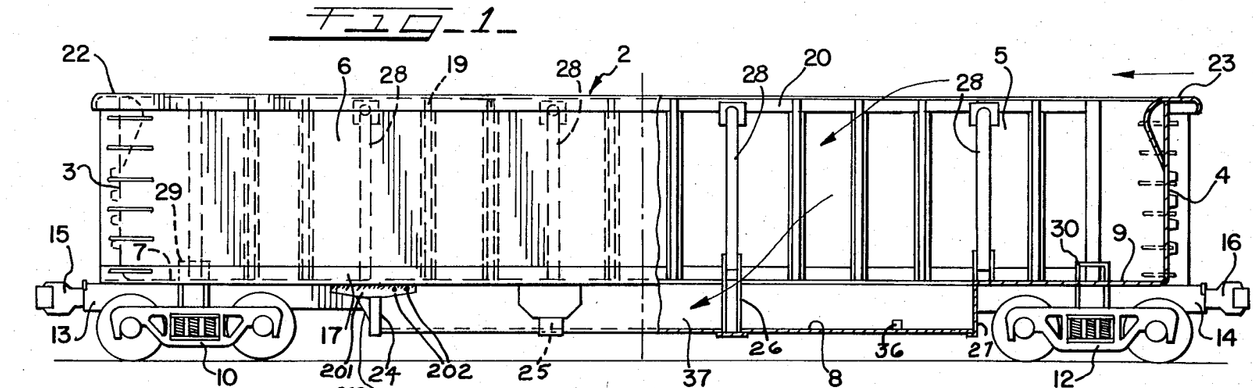
FIG. 1 is a partially cutaway side elevation view of an open top gondola type railway car having the structure of this invention.
Figure 2:
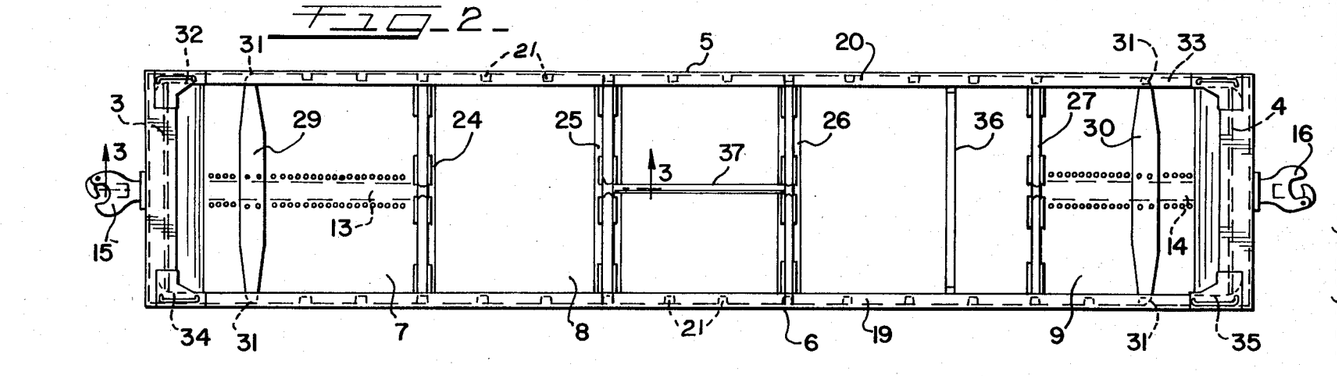
FIG. 2 is a top view of the railway car shown in FIG. 1.

FIG. 1 shows a partially cutaway elevation view of a railway car 2 of the open top gondola type often used to haul bulk cargo, such as coal. FIG. 2 shows a top or plan view of railway car 2.

Car 2 is comprised of a cargo carrying box structure having a first end wall 3, a second end wall 4, a pair of substantially parallel, laterally spaced side walls 5 and 6 which extend between and connect to end walls 3 and 4, and a bottom closure comprised of bottom members 7, 8 and 9.

A plurality of conventional wheel truck assemblies, such as assemblies 10 and 12 are engaged with the cargo carrying structure for rollingly supporting the box and associated coupling structures, such as stub draft sills 13 and 14 and couplers 15 and 16 for connectingly engaging one or more other cars in a conventional train.

Bottom members 7 and 9 serve a dual function. They provide a bottom end closure for the cargo carrying structure and they also serve as shear plates to beam draft and buff loads from the stub center sills 13 and 14 laterally outwardly to a pair of longitudinally extending side sill members 17 and 18, best shown in cross section in FIGS. 5 and 10. Side sill members 17 and 18 serve as connective members between the bottom members and the side members. They also serve as a primary load bearing beam for lateral forces imposed on them and the adjacent bottom or side portion of the box by the lading or cargo while serving as the primary longitudinal draft and buff load carrying beams or members of the cargo carrying structure of the car.

A pair of top chord or beam members 19 and 20 are affixed to the top portion of each side 5 and 6, as best shown in FIGS. 3, 4, 5 and 8. Members 19 and 20 extend longitudinally along the car body and each is substantially parallel to, and spaced substantially vertically above, a side sill member 17 and 18, respectively.

Each of the side sill members 17 and 18 and top chord members 19 and 20 are preferably formed as a continuous extrusion of a weldable aluminum alloy.

Aluminum sheets, preferably formed of an aluminum alloy, extend between each side sill and the top chord above it and are rigidly attached to each the side sill and the top chord by appropriate means such as, preferably, welding.

A plurality of vertically extending side support members 21, as best shown in FIGS. 2, 3, 4, and 5, also preferably formed as continuous extrusions of a weldable aluminum alloy, are ridgidly fixed in spaced relationship longitudinally along the side wall of the car sides and extend vertically between a side sill member and the top chord member. These side wall support members are affixed to the interior surface of each side wall plate preferably by welding and extend laterally inward into the cargo carrying space of the car structure to provide a smooth exterior surface on each side wall. This arrangement provides minimum resistance to air flow and increases the load carrying capacity of the railway car because with the side support members on the inside the spaces between the side wall support members provide additional cargo capacity when compared to a car of maximum AAR standard width with the vertical side supports on the outside of the side wall.

Car 2 has an airfoil 22 and 23 affixed to the top portion of each end 3 and 4, respectively. Bottom portion 8 is sunken or depressed below the level of floor or bottom portions 7 and 9 to increase the cargo carrying capacity of the car.

Figure 3:
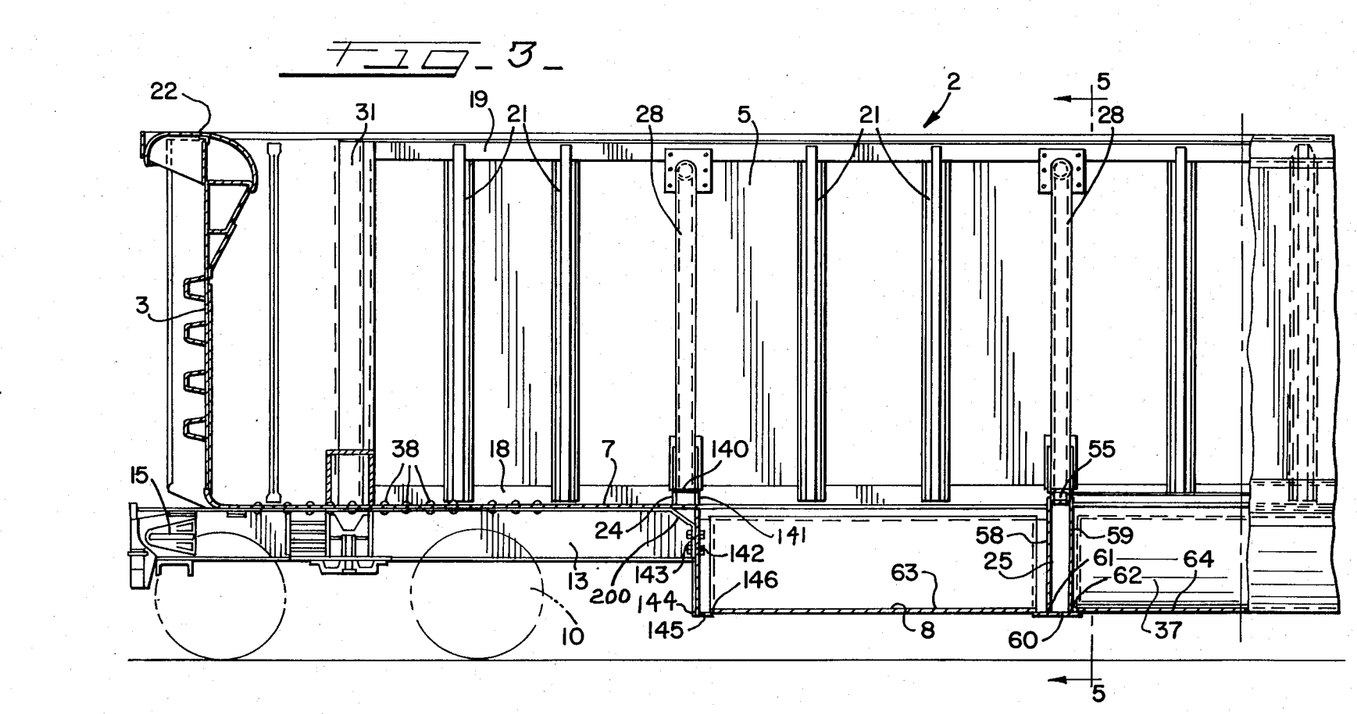
FIG. 3 is an enlarged side elevation view of a portion of the car shown in FIG. 1.
Figure 4:
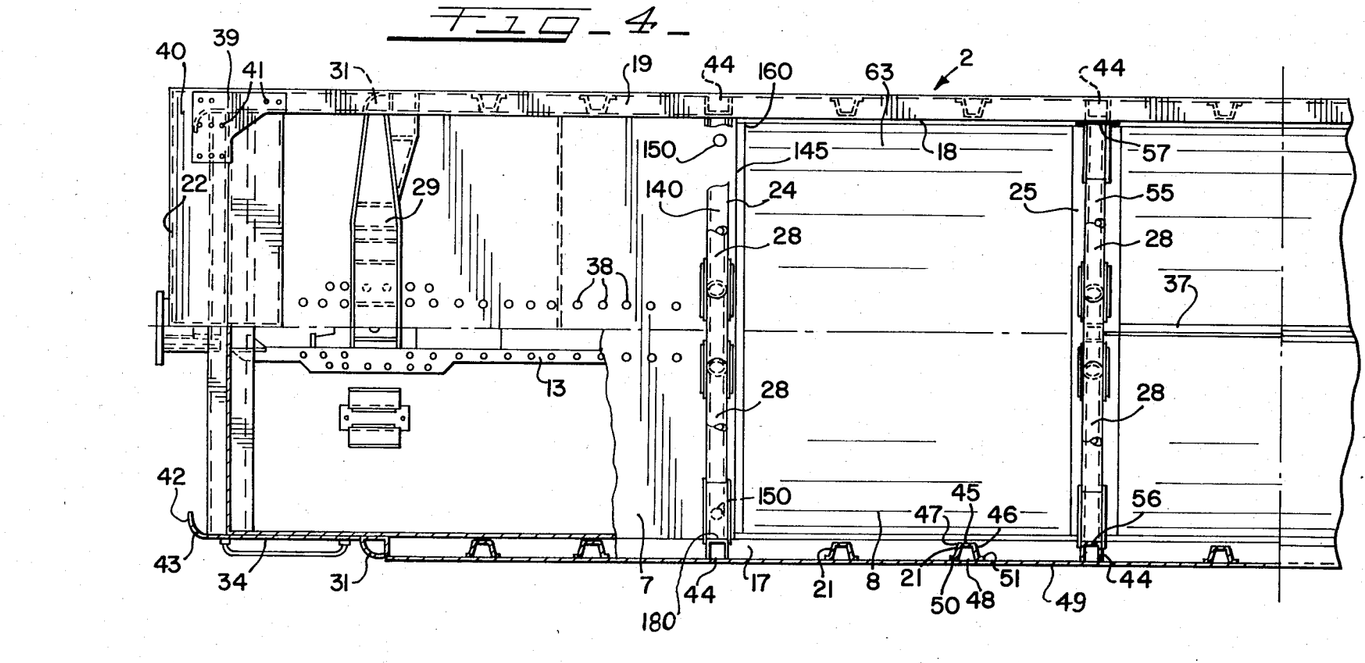
FIG. 4 is an enlarged top partially cutaway view of FIG. 2.
Figures 5, 6, 7:
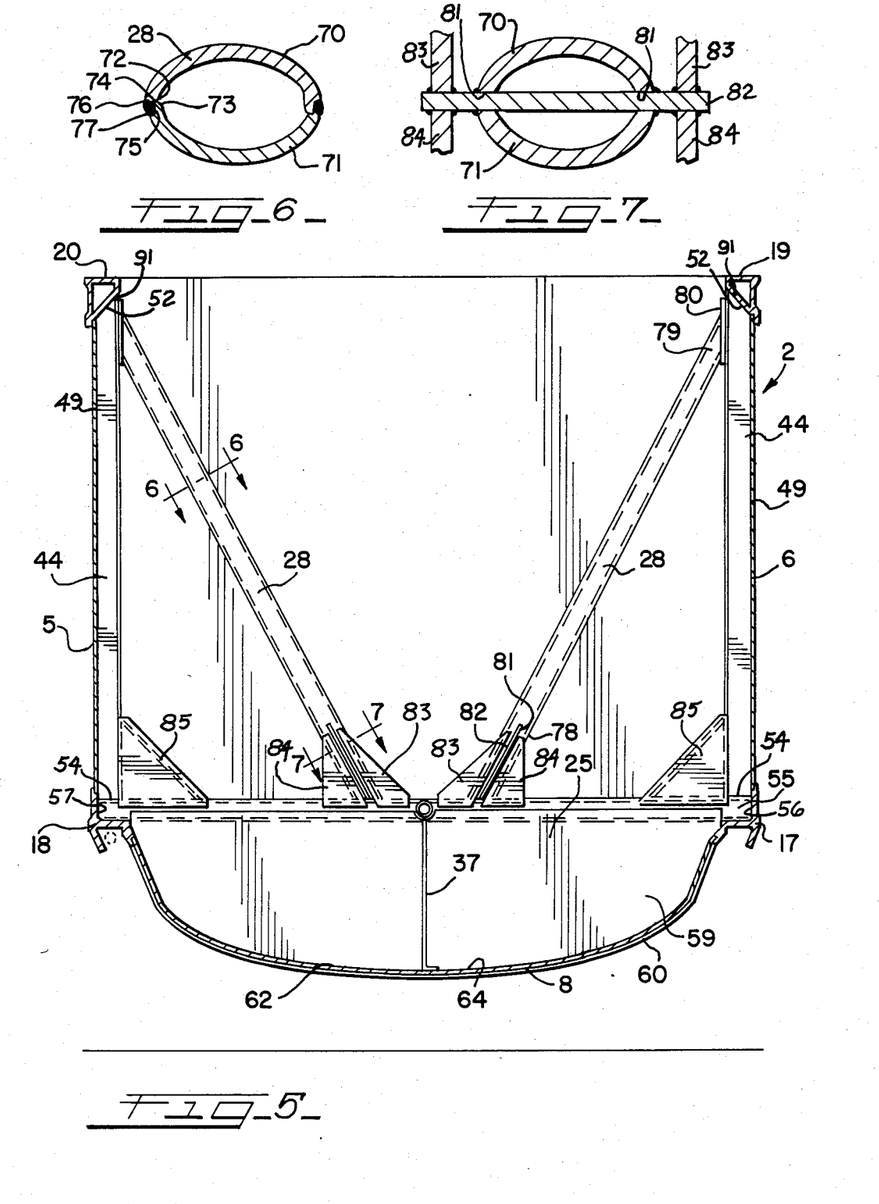
FIG. 5 is a sectional view of the car shown in FIG. 3 as indicated by the section line 5—5.
FIG. 6 is a sectional view of a diagonal support strut shown in FIG. 5, as indicated by the sectional line 6—6.
FIG. 7 is a sectional view of a diagonal support strut shown in FIG. 5, as indicated by the section line 7—7.

A plurality of crossridge supports, such as crossridges 24, 25, 26 and 27, are positioned on the interior of the car to provide load bearing strength to the floor portion 8 and to, in conjunction with a plurality of diagonal support means, such as diagonal support struts 28, as best shown in FIGS. 3, 4 and 5, strengthen and rigidify the side walls 5 and 6.

Car 2 is further comprised of a first fabricated bolster 29 formed above and integral with bottom or floor portion 7 and a second fabricated bolster 30 formed above and integral with bottom or floor portion 9.

As best shown in FIG. 2, a vertically extending transition means, such as bolster posts 31 are positioned at an outward or laterally outermost end of each of the bolsters 29 and 30. Each bolster post 31 serves as an aerodynamic or low air flow resistant transition member between the main sides 5 and 6 and a laterally inward offset side portion, such as side portions 32 and 33 of main side 5 or laterally inward offset side portions 34 and 35 of main side 6. Offset side portions 32, 33, 34 and 35 are placed laterally inward from main sides 5 and 6 to enable placement of ladder or step brackets on these portions without exceeding standard AAR car width requirements.

A minor or supplemental crossridge assembly 36 is affixed to bottom portion intermediate crossridges 26 and 27 and a longitudinally extending support web 37 is affixed to and extends between crossridge assemblies 25 and 26.

FIG. 3 shows in an enlarged sectional view a portion of the car shown in FIGS. 1 and 2, FIG. 4 is a top partially cutaway view of FIG. 3 and FIG. 5 is a sectional view of FIG. 3.

As shown in FIGS. 3 and 4 stub center sill 13 is rigidly affixed to bottom or floor and shear plate member 7 by a plurality of mechanical fasteners, such as bolts or rivets 38 due to the stub center sill being formed of steel and plate 7 being an aluminum alloy whereby welding these two metals is impractical. The attachment of sill 14 to plate 9 is substantially identical to the attachment of plate 7 to sill 13.

Typical corner construction is shown in FIG. 4 whereby attachment means, such as gusset plate 39, is affixed to each top chord 19 and a top surface portion 40 of airfoil 22 by appropriate means, such as welding or, as shown, a plurality of mechanical fasteners, such as rivets 41.

As shown at the opposite corner the terminal end 42 of offset side portion 34 is inwardly curved to an aerodynamic, drag reducing convex curve 43 to enhance or promote smooth or non-turbulent airflow around the corner and onto the smooth side of wall 34. Each of the offset side portions 32, 33 and 35 have a substantially identical curved terminal end portion for precisely the same reason.

FIG. 5 shows engagement of diagonal struts 28 with side support members 44. A pair of struts 28 are positioned laterally in the car in alignment with each other to form a portion of crossridge assembly 25. Side support members 44 are configured differently from side support members 21 as members 21 are, as best shown in FIG. 4, aluminum extrusions having three walls, 45, 46 and 47 and an open side 48 closed by a side plate 49 formed as an integral portion of side 6. Each wall 46 and 47 diverges from wall 45 and has an integrally formed short attachment web, such as webs 50 and 51 to facilitate welding each of the members 21 to a side plate 49. The top end portion of each member 21 is appropriately coped to mate with the inner wall of a top chord member.

Members 44, on the other hand, are three walled tubular aluminum extrusions substantially rectangular in cross section to increase their strength and provide an inner facing wall surface 180 for readily engaging other components of the crossridge assemblies 24, 25, 26 or 27. Members 44, referring again to FIG. 5, have an upper terminal end 52 coped to matingly engage an angled wall portion 91 of top chord member 19 or 20 and a lower terminal end 54 which engages and is welded to a substantially rectangular laterally extending crossridge member 55 of crossridge assembly 25. Member 55 has a first end 56 rigidly affixed to side sill 17 and a second end 57 rigidly affixed to side sill 18. A pair of side plates 58 and 59, best shown in FIG. 3, are welded to member 55 and extend downwardly. A lower terminal end 61 and 62 respectively, of each of the plates 58 and 59 is formed to conform to a floor or bottom support band 60 positioned supportingly beneath and welded to the floor plates 63 and 64 comprising bottom or floor section 8, substantially as shown in FIG. 3.

As best shown in FIGS. 5, 6 and 7, a pair of diagonal support struts 28 are attached to an intermediate portion of crossridge assembly 25 and angle upwardly and outwardly to engage an upper interior portion of a side wall.

Struts 28 are, as best shown in cross section in FIG. 6, formed of two substantially mirror image semi-elliptical aluminum extrusions 70 and 71 which are placed together to form a composite strut substantially elliptical in cross section.

Each half of the composite strut is provided with location facilitating mating surfaces such as abutment shoulders 72 and 73 and lateral engaging surfaces 74 and 75 to facilitate assembly of the two halves. A weld relief is provided along each joint by surfaces such as 76 and 77 and members are welded along each side in the weld relief gap between surfaces 76 and 77, as shown.

Each strut 28 has a lower end portion 78 and an upper end portion 79. Upper end portion 79 is coped at an angle and weldably engaged with an attachment plate 80 which is affixed, such as by bolts, to an upper portion of a crossridge vertical member 44.

Adjacent lower end 78 to each strut 28 an attachment plate receiving slot 81 is formed between the two mating halves and an attachment 82, as shown in each FIGS. 5 and 7, is inserted into and welded in the slot. Attachment plate 82 extends laterally outwardly on each side of the strut and two attachment plates 83 and 84 are welded to a laterally extending portion of attachment plate 82. Plates 83 and 84 are welded to crossridge member 55 and thereby struts 28 serve to rigidify and support the top portion of each side wall 5 and 6.

A pair of gusset plates, such as plates 85, are preferably rigidly connected by welding to each horizontal crossridge member 55 and a vertical crossridge member 44 to further rigidify the crossridge assembly.

As shown, each strut 28 is assembled into the car body with its major axis parallel to the longitudinal axis of car 2 and with its minor axis transverse to the longitudinal axis of the car to provide a strong, durable strut which presents a minimal surface which is aerodynamically shaped to reduce the aerodynamic drag of air flowing through the car body when the car is empty. Orienting the struts in this manner minimizes the resistance to air flow offered by the struts when the car is empty.

Figures 8, 9, 10:
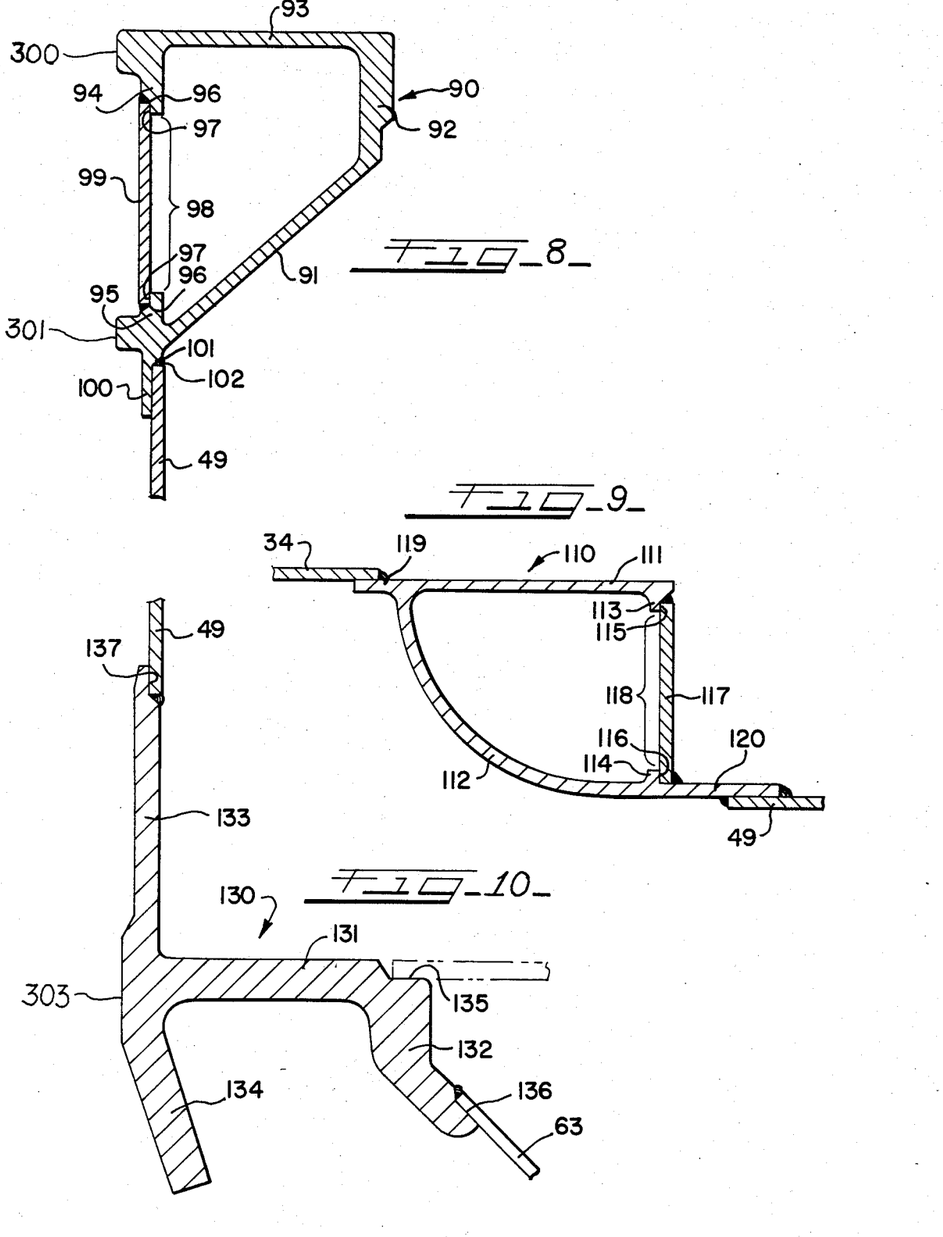
FIG. 8 is an enlarged sectional view of the top sill support member shown in FIG. 5.
FIG. 9 is an enlarged sectional view of the vertical side transition member shown in FIG. 4.
FIG. 10 is an enlarged cross sectional view of the side still member shown in FIG. 5.

FIG. 8 is an enlarged typical cross sectional view of one of the continuous aluminum extrusion top chord members 19 and 20 having a closure plate 99 and side plate 49 attached. Extrusion 90 is comprised of first, second and third wall portions 91, 92 and 93, respectively. Two stub walls 94 and 95, each having a filler plate receiving shoulder 96 and an abutment shoulder 97, extend toward each other and are separated by a gap or space 98. Space 98 enables selective placement of reinforcing members (not shown) into the interior surface of the extrusion and provides access to enable such reinforcement to be welded to the interior surfaces of walls 91, 92 and 93. Closure plates 99 can then be abutted against abutment shoulders 97 on the stub walls and welded into place to complete the assembly.

A downwardly depending wall portion 100 having an upper location shoulder 101 is provided to receive an upper terminal portion of a side wall plate, such as plate 49 which is then rigidly attached to extrusion 90 by weld 102.

FIG. 9 shows an enlarged crosssectional view of one of the bolster posts 31. Each bolster post 31 is formed of a continuous aluminum extrusion 110 having a straight wall 111 and a curved wall 112. A pair of stub walls 113 and 114 having abutment shoulders 115 and 116 are provided for receivingly engaging a closure plate 117. As with the top chord extrusion 90, extrusion 110 is provided with a gap 118 between the stub walls 113 and 114 to enable selective placement of reinforcing means, such as plates (not shown), within extrusion 110 for securement, as by welding, to the interior surfaces of walls 111 and 112. Closure plate 117 may then be welded into position to complete the assembly.

A first laterally inwardly positioned longitudinally extending wall portion 119 is provided for engaging and being welded to a laterally offset side wall portion, such as offset wall 34 and a second longitudinally extending wall 120 is, provided for engagement with and being welded to the plates of a main side wall such as plate 49 of side wall 6.

As shown, curved wall 112 of extrusion 110 provided an efficient air flow surface transition between the laterally inward side walls, such as wall 34 and the main side wall, such as side wall 6, as shown, to increase the aerodynamic efficiency of the car in transit during both the loaded and unloaded condition.

FIG. 10 is an enlarged cross sectional view of the side sill members 17 and 18. Each side sill is formed of a continuous aluminum extrusion, such as extrusion 130, having a substantially horizontal body portion 131, having an integral laterally inward downward depending portion 132, an integral laterally outward upward extending portion 133 and a laterally outward downward depending portion 134.

Body portion 131 has a bottom plate abutment shoulder 135 for abuttingly receiving horizontal bottom and shear plates, such as plates 7 and 9, represented in phantom.

Downwardly depending member 132 has a bottom plate abutment shoulder 136 for abuttingly receiving a member of bottom 8, such as plate 63. The upwardly extending portion has an abutment shoulder 137 for abutingly receiving a side plate member, such as side plate 49 of side 6.

The side wall plate members 49 and/or bottom and shear plate members 7, 9 and/or plates of depressed bottom portion 8 are welded to side sill extrusions 130 to complete the assembly.

Welding tends to weaken metals in the heat affected zone of the weld. Therefore, extrusion 130 has been designed so laterally outward downward depending member 134 remains substantially unwelded in a completed gondola car. The side sill serves as a welded connective member between the bottom and side portions of the car while retaining the strength required to support cargo contained within the load carrying structure and transmitting and sustaining the substantial tensile and compressive, or draft and buff, loads imposed upon it by the stub center sills 13 and 14 acting through the shear plates 7 and 9.

Crossridge assembly 26 is substantially identical to crossridge assembly 25 as described in detail above. Also, crossridge assemblies 24 and 27 are substantially identical to each other as they each have only one web or depending plate and they are located at the transition area between bottom shear plates 7 and 9 and the depressed bottom area generally indicated at 8.

Referring to FIGS. 3 and 4, crossridge assembly 24 is comprised of a pair of vertical cross ridge members 44 with a three wall extrusion 140 extending horizontally between the lower end portions of members 44, the diagonal struts 28 which are elliptical in cross section are attached to member 140 and the upper portion of vertical side posts 44 in substantially the same way as above described in crossridge assembly 25.

Extrusion 140 is positioned open side down on the shear plate, such as plate 7, and welded into position. A downwardly depending plate 142 is welded to shear plate 7 directly beneath the vertical wall 141 of extrusion 140 which is adjacent to depressed floor section 8. A portion of plate 142 is mechanically affixed, such as with bolts, to a terminal end of a stub sill, such as end 143 of stub center sill 13. The lower end 144 of plate 142 is cut to conform to the substantially two radius curve of the depressed section bottom plates and welded to a support band 145. Support band 145 is positioned supportingly beneath depressed area floor plate 63 adjacent its terminal end 146 and the plate 63 and band 145 are welded together to form a strong transition bottom closure. Crossridge assembly 27 is substantially a mirror image of crossridge assembly 24.

As best shown in FIG. 4, from which a portion of crossridge assembly has been cutaway, an opening 150 is positioned in shear plate and bottom closure member 7 adjacent corner 160. Corner 160 is the point at which the side sill 18, plate 63 of depressed floor portion 8 and bottom support band 145 intersect. As this is a critical corner opening 150 is provided in the shear plate 7 to isolate corner 160 from draft and buff loads transmitted by the stub center sill through the shear plate 7 and into the side sill 18. Opening 150 assures that such force loadings will not be concentrated at corner 160 and it thereby serves to protect the integrity of the welds at corner 160. Buff and draft forces in the railway car are transmitted from the stub sill 13 to shear plate 7. Shear plate 7 transfers the load to side sills 17 and 18, which extend the length of the car and transfer the load at the other end of the car to the other shear plate 9. Shear plate 9 transfers the load to other stub sill 14.

The lateral transfer of longitudinal loading from the shear plates 7 and 9 to the side sills 17 and 18 places a shear load on the weld between the shear plate and the side sill. This loads tends to be greatest at corner 160 and to gradually diminish longitudinally along the weld between the shear plate and side sill as the longitudinally inward portion of the weld incrementally transfers the load from the shear plate to the side sill. The maximum shear stress is found at corner 160, exposing the weld connection at that point to the highest risk of failure. The stress at corner 160 is reduced by opening 150 which functions to soften corner 160 and allow it to deform slightly to defer some of the shear stress to the weld longitudinally outward of corner 160. As a result, the weld longitudinally outward of corner 160 is loaded somewhat more than otherwise, and the weld at corner 160 is to a degree isolated from the shear forces passing through the shear plate.

Force isolating opening 150 is covered by the horizontal crossridge member 140 and cargo is thereby prevented from falling through this opening. A similar opening for the same purpose is located in each corner of each shear plate 7 and 9 adjacent depressed floor section 8.

Also, at the corners 160, a box reinforcement member 200, as shown in FIG. 1, is provided to transmit loads from web or plate 142 to post 44 and a side sill member. Reinforcement member 200 is particularly desirable as web 142 is not centered on posts 44.

Additional reinforcement is provided in the area of corners 160 by an outside reinforcement plate 201 which is attached to side sill leg 132 and extends longitudinally in each direction from the terminal end of shear plate 7, as shown in FIG. 1. Preferably, appropriate means, such as a plurality of bolts 202, are used to affix member 201 to bottom closure plate 8.

As best shown in FIGS. 8, 9 and 10, the components 90, 110 and 130 are structured to provide a rigidifying, strength enhancing structural back-up for the welds. Specifically, in FIG. 8 downwardly depending wall 100 provides support for weld 102 which connects top chord member 90 to side wall plate 49.

Also, as shown in FIG. 9, the forward end portion 119 of straight wall 111 of bolster post extrusion 110 provides an overlapping structural back-up for the weld connecting wall 34 to wall 11.

FIG. 10 shows abutment shoulders 135, 136 and 137 providing a structural reinforcement or back up for each of the components welded adjacent them.

Each of the above constructions aids in preventing fatigue of the respective welds as the point of flexure of the sheet is transferred from the weld area to the area where the back-up structure terminates with respect to the sheet or plate it is welded to.

As best shown in FIG. 8 top chord member 90 is provided with laterally outward extending increased thickness flange areas or protuberances 300 and 301. These areas provide abrasion resistance for the top chord members formed of extrusion 90.

Similarly, as best shown in FIG. 10, the extrusion 130 forming the side sills 17 and 18 has an increased thickness portion 303 which extends laterally outwardly beyond the laterally outward surface of side connective member 133 to provide abrasion resistance for the side sills.

What is claimed is:

1. A cargo carrying structure for a railway car, said structure comprising:

a first and a second stub center sill longitudinally spaced from each other;

a first shear plate member rigidly affixed to said first stub center sill;

a second shear plate member rigidly affixed to said second stub center sill;

a depressed floor section extending between said longitudinally spaced stub center sills and rigidly engaged with each said first and said second shear plate members;

a pair of side sill members being positioned along lateral side portion of each said first and second shear plate members and said depressed floor section of said cargo carrying structure, said side sill members bearng draft and buff loads in the cargo carrying structure;

a pair of side wall members each connected with a respective side sill member and extending upwardly therefrom;

each of the side sill members being a single integral member having:

a bottom connective first portion extending substantially the length of the side sill member and generally inward of the car on the cargo carrying structure, said first portion being rigidly connected to each of said first and second shear plate members and to said depressed floor section;

a side wall connective second portion formed integral with the first portion and extending generally upwardly therefrom, said second portion being rigidly connected to one of the side wall members; and a downwardly extending outer reinforcement flange connected with the bottom connective portion and extending substantially continuously along the longitudinal length of the side sill member, whereby said side sill members serve as connective cargo carrying members between said shear plate members and said side wall members and said side sill members are strengthened to serve as draft and buff load bearing members between said first and second shear plate members; and said first portion of each of said side sill members comprising a substantially horizontal body portion being welded to the shear plate member and being in the same general plane as the shear plate member, said body portion having a first laterally inward positioned downward depending depressed bottom connective member, said second portion comprising a second laterally outwardly positioned upward extending side connective member and said reinforcement flange comprising a third laterally outward positioned downward depending strengthening member which is substantially unwelded.

2. The invention according to claim 1 and the side wall members being welded to the respective second portions of the side sill members; and the reinforcement flanges being unwelded and extending substantially out of the heat effect zone of the welds to the first and second portions for reinforcing the side sill members as load bearing members.

3. The invention according to claim 1 and said side sill members being formed of a continuous aluminum extrusion.

4. The invention as defined in claim 1, and one of said shear plate members having an opening therein adjacent one of said side sill members and said depressed floor section for permitting said shear plate member to deform to prevent force concentration at the intersection of said shear plate member, said depressed floor section and said side sill member.

5. The invention as defined by claim 4 together with a covering member covering said opening for preventing flow of cargo through said opening.

6. The invention as defined in claim 1 in which a recess is formed by said body portion and said first and third members for protectingly receiving fluid flow conduits.

7. The invention as defined in claim 1 and said body portion of said side sill member having a first abutment shoulder for abuttingly engaging one of said shear plate members and said first connective member having a second abutment shoulder for abuttingly engaging said depressed floor section.

8. The invention as defined in claim 1 in which said third laterally positioned downward depending strengthening member has a portion extending laterally outward beyond said upward side connective member for protecting said side sill member from abrasion.

9. The invention as defined in claim 1 in which said side wall member comprises a sheet of aluminum welded to said upwardly extending portion of said side sill members.

10. The invention as defined in claim 9 together with said sheet of aluminum side wall member having an upper terminal end positioned substantially vertically above said upwardly extending portion of said side sill member, said upper terminal end being substantially parallel to said side sill member and a tubular aluminum extrusion top chord member welded to a portion of said side wall member adjacent said upper terminal end.

11. The invention as defined in claim 10 in which said top chord member has laterally outward extending abrasion resistance means.

12. The invention as defined in claim 11 in which said abrasion resistance means are a pair of protuberances.

13. The invention as defined in claim 10 together with a plurality of vertically extending crossridge assembly side posts longitudinally spaced along an interior surface of said side wall member, each of said crossridge assembly side posts having a lower end portion welded to a crossridge member welded to a side sill member, an upper end portion welded to a top chord member and an intermediate portion welded to said side wall member.

14. The invention as defined in claim 13 in which each of said top end portions of each of said crossridge assembly side posts is cut at an angle to abuttingly engage a portion of said inward upward sloping wall of said top chord member.

15. The invention as defined in claim 10 in which said top chord member has an upward, inward extending wall.

16. The invention as defined in claim 15 together with a plurality of vertically extending side support members longitudinally spaced along an interior surface of said side wall member, each of said side support members having a lower end portion welded to a side sill member and an upper end portion welded to said top chord member and an intermediate portion welded to said side wall member.

17. The invention as defined in claim 16 in which said side support members have laterally inward extending tapered walls.

18. The invention as defined in claim 16 in which each of said top end portions of each of said side support members is cut at an angle to abuttingly engage a portion of said inward upward sloping wall of said top chord member.

19. A railway car having two opposite longitudinal ends and comprising:
   first and second stub center sills adjacent respective ends of the car;
   first and second shear plate members each connected with a respective stub center sill for transferring loads thereto, each of said shear plate members having laterally opposing side portions;
   a depressed floor section supported between the shear plate members;
   a pair of longitudinally extending side sill members, each of the side sill members being connected with a respective side portion of each of the shear plate members;
   a pair of side walls, each side wall extending generally upwardly from a respective side sill member, said side walls defining a space therebetween for carrying cargo in the railway car;
   each of said side sill members being a single integral member comprising:
   a generally laterally inward extending first portion being welded to the shear plate members and being generally in the same plane therewith;
   a second portion, extending generally upwardly from the first portion and being welded to the respective side wall; and
   an outward positioned reinforcement flange portion formed integral with the first portion and extending downwardly therefrom, said flange portion being substantially unwelded and out of the heat effect zone of the welds to the side wall and the shear plate members whereby each of the side sill members is strengthened by the flange portion to bear draft and buff loads in the railway car; and
   the first portion having a first laterally inward positioned downward depending depressed bottom connective portion and being connected with the depressed floor section.

20. The invention according to claim 19 and the first and second portions forming a generally angle-shaped portion of the side sill member.

21. The invention according to claim 19 and the side sill members being formed of continuous aluminum extrusions.

22. The invention according to claim 19 and first and second side support members extending upwardly from said first and second side sill members respectively adjacent said inward end portion of said first shear plate member, each of said side support members being connected to the respective side wall for transferring loads between the side wall and the side sill member;
   a depressed floor section supported between the shear plate members to provide additional cargo space in the railway car;
   web means connected with the inward end portion of the first shear plate member and extending downwardly therefrom, said web means being connected to the depressed floor section to form an end wall; and a reinforcement member connected to the web means and supported substantially below the first side support member whereby loads created by cargo resting against the web means are transferred through the reinforcement member, to the side support member, and into the side wall structures.

23. The invention according to claim 22 and
said first stub center sill having a terminal end portion engaging the web means and fixedly connected thereto for reinforcing the web means for bearing loads created by cargo resting thereagainst.

24. The invention according to claim 19 and
said bottom connective portion of the side sill members being welded to said depressed floor section for transferring loads therein to the side sill members.

25. The invention according to claim 24 and
a first crossmember extending laterally with respect to the car above the depressed floor section and being supported on said side sill members.

26. The invention according to claim 25 and
a first support plate means connected to the first crossmember and extending downwardly therefrom, said first support plate means being connected to the floor section for transferring loads therefrom to the crossmember.

27. The invention according to claim 26 and
said first support plate member comprising a pair of longitudinally spaced plate support members, each of said plate members being connected to said crossmember and said floor section.

28. The invention according to claim 26 and
a second crossmember extending laterally with respect to the car above the depressed floor section and being supported on the side sill members, the second crossmember being spaced longitudinally on the car from the first crossmember.

29. The invention according to claim 28 and
a second support plate means connected to the second crossmember and extending downwardly therefrom and being connected to the depressed floor section for transferring loads therein to the second crossmember.

30. The invention according to claim 29 and
support web means being connected to said first and second support plate means and extending generally vertically and longitudinally therebetween for reinforcing said floor section and support plate means.

31. A railway car having two opposite longitudinal ends and comprising:
first and second stub center sills adjacent respective ends of the car, said stub center sills each having respective inward terminal ends spaced with respect to each other and positioned generally longitudinally inwardly of the car;
first and second shear plate members each connected with a respective stub center sill for transferring loads thereto, each of said shear plate members having laterally opposing side portions;
a pair of longitudinally extending side sill members, each of the side sill members being connected with a respective side portion of each of the shear plate members to bear longitudinal draft and buff loads in the car;
a depressed floor section supported between the shear plate members and connected with each of the side sill members;
a first crossmember longitudinally spaced from the shear plate members extending laterally with respect to the car above the depressed floor section, and being supported on the side sill members;
first support plate means depending from said first and second crossmember and being connected with the floor section for transferring stresses therein to the first crossmember;
a second crossmember longitudinally spaced from the first crossmember and the shear plate members and supported on the side sill members and extending therebetween above the depressed floor section;
second support plate means being connected with the second crossmember and extending downwardly therefrom, said second support plate means being connected with the floor section for transferring stresses therein to the second crossmember; and
reinforcing web means being connected to the first and second crossmembers and to the first and second support plate means intermediate the ends of the first and second crossmembers, said reinforcing web means extending generally vertically and longitudinally therebetween and being connected to the depressed floor section for reinforcing said floor section and said support plate means.

32. The invention according to claim 31 and
said web means being attached to the floor section for additional structural strength in said depressed floor section.

33. The invention according to claim 31 and
said web means comprising a generally vertical web attached to the first and second support plate means and extending from said crossmember downwardly to said floor section and being connected thereto.

34. The invention according to claim 31 and
said floor section comprising:
floor support means connected to the support plate means and
a floor plate member fixedly connected with the floor support means.

35. The invention according to claim 31 and
said first support plate means comprising a pair of spaced vertical plates connected to the first crossmember.

* * * * *